United States Patent [19]
Haraguchi et al.

[11] Patent Number: 4,500,185
[45] Date of Patent: Feb. 19, 1985

[54] FILM TRANSPORTATION DEVICE FOR CAMERA

[75] Inventors: Shosuke Haraguchi, Kanagawa; Yoichi Tosaka, Tokyo, both of Japan

[73] Assignee: Canon Kabushiki Kaisha, Tokyo, Japan

[21] Appl. No.: 454,627

[22] Filed: Dec. 30, 1982

[30] Foreign Application Priority Data

Jan. 14, 1982 [JP] Japan ................................. 57-4317

[51] Int. Cl.³ .............................................. G03B 19/04
[52] U.S. Cl. .................................... 354/209; 242/71.6
[58] Field of Search ............... 354/209, 214, 207, 208, 354/205; 242/71.4–71.6

[56] References Cited

U.S. PATENT DOCUMENTS 3,645,182  2/1972  Kimura ............................... 354/205
4,089,483  5/1978  Hokkanji et al. .............. 354/214 X
4,236,799 12/1980  Kobayashi ......................... 354/209

Primary Examiner—John Gonzales
Attorney, Agent, or Firm—Toren, McGeady and Stanger

[57] ABSTRACT

A film transporation device for a camera having an operating member adapted upon changeover thereof to a rewinding position to render a sprocket freely rotatable so that rewinding of a film is possible and a locking member for holding the operating member in the rewinding position, wherein a member is provided upon winding-up of the camera to move forward as it is operatively connected to a winding system and upon termination of the winding operation to move backward under the action of a bias force of a spring member as the operative connection is severed, whereby the backward movement of this member operates to release the operating member from the connection with the locking member, thereby enabling superimposition of a number of photographs.

5 Claims, 4 Drawing Figures

FILM TRANSPORTATION DEVICE FOR CAMERA

BACKGROUND OF THE INVENTION

1. Field of the Invention

This invention relates to film transportation devices for cameras and more particularly to film transportation devices for cameras with means making it possible to superimpose two or more photographs or exposures.

2. Description of the Prior Art

It is known in the art to provide a wide variety of cameras which are made to permit intentional double and multiple exposures on the same frame of film by using an arrangement whereby the film rewind release member is latched in the rewinding position with the drive connection between the rapid-winding lever (or, in the case of the automatic camera, the motor) and the sprocket being cut off. With the rewind release member held in the rewinding position, when a winding operation of the camera is effected, the shutter mechanism only is allowed to operate. Responsive to termination of a certain winding operation, the rewind release member is released from the latching connection. For example, U.S. Pat. No. 4,089,483 (May 16, 1978) discloses a camera in which means is provided for hindering the rewind release button from returning, this hindering means being arranged upon termination of the winding operation to be pushed away by a cam which rotates in a certain direction when winding is being performed, so that the rewind release button returns to the initial position.

However, in such a conventional camera, because it uses the cam in taking the rewind release button out of the locking connection as the rotation of the cam stops when the shutter cocking operation is terminated, there arises a drawback in that in order to achieve an accurate superimposition of two or more exposures in the same frame of film, it is required that the sprocket and the rapid winding lever (or motor) not be brought into drive connection with each other until cocking of the shutter is completed. For this purpose, according to such prior art, the aforementioned cam must be arranged to release the rewind button from the locking connection at exactly the same time that the cocking operation is terminated. In actual practice, however, it is impossible to always establish such accurate synchronization. With such means, therefore, it often happens that when cocking the shutter to superimpose the next shot, the film is caused to advance though a short length, or that the aforementioned locking connection cannot release.

To improve the reliability of operation, each part must be manufactured within a very severe tolerance for precision accuracy, thereby creating an additional disadvantage from an economical standpoint.

SUMMARY OF THE INVENTION

With the foregoing in mind, the present invention may be briefly described as a film transportation device for a camera having a member arranged to move forward when winding is being performed, and to initiate a backward movement to the initial position under the biasing action of a spring member from a time just before termination of the winding operation, whereby the backward movement of this member is utilized in releasing the film-rewind release member from the locking connection with the advantage that when making double and multiple exposures on the same frame of film, it is possible to return the rewind release member with high accuracy and reliability in response to termination of the shutter cocking operation.

Although the present invention is primarily directed toward a film transportation device for a multiple-exposure camera, it is also applicable to other types of cameras which need not have the capability of performing a multiple-exposure technique.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
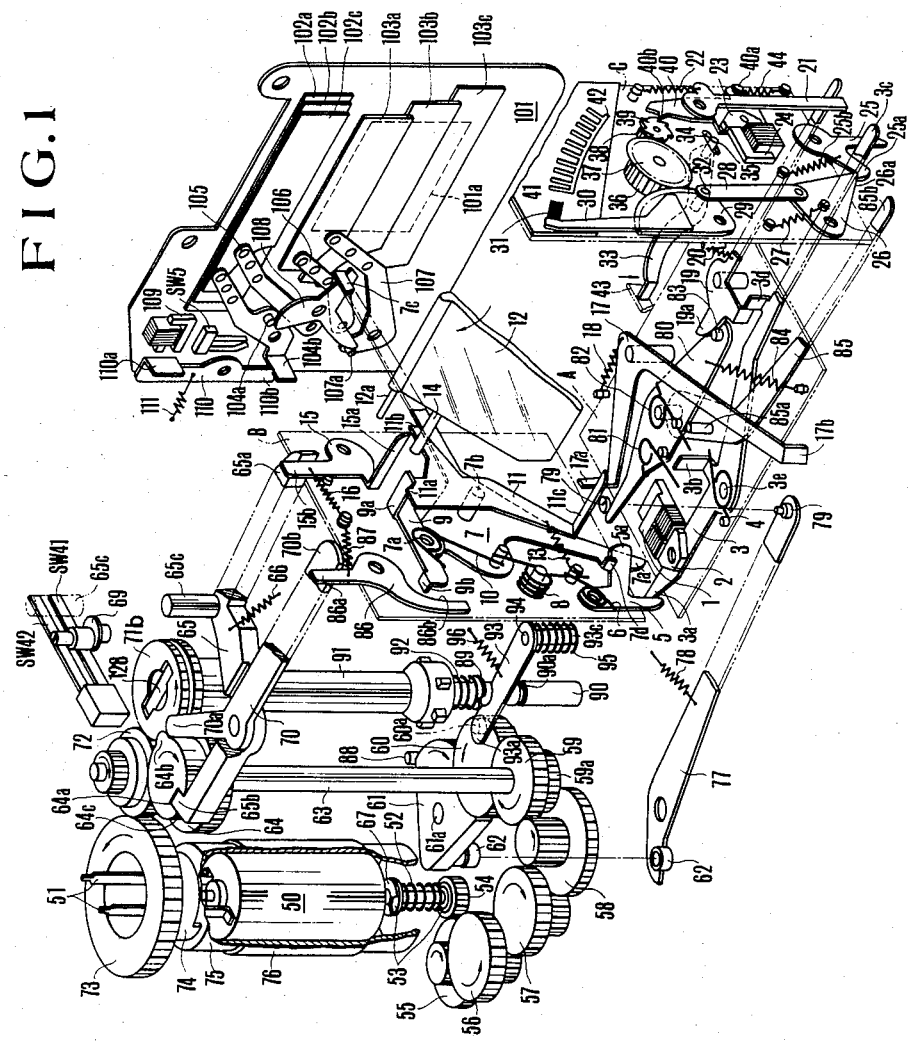
FIG. 1 is an exploded perspective view of an embodiment of a camera having a film transportation device according to the present invention.

In FIG. 1, A is a diaphragm drive unit for imparting driving motion to a diaphragm closing-down lever (not shown) in a photographic lens mounting; B is a mirror operating unit for retracting a mirror 12 out of a light path where it reflects light coming from an object to be photographed to a finder optical system only when an exposure is made; C is an aperture control unit for controlling the size of the aperture opening of the diaphragm by determining the position of an aperture signal lever in the photographic lens mounting. The various mechanisms of FIG. 1 are assumed to be ready for an exposure. 1 is a magnet unit using a permanent magnet fixed to unit A. An armature 2 pivotally mounted on a release lever 3 is shown in the drawing as attracted to the magnet unit 1 by the magnetic force of the permanent magnet. When a release button (not shown) is pushed down by the photographer, as is well known, a control circuit supplies current to a solenoid in magnet unit 1, thereby suppressing the attractive force of magnet unit 1 to armature 2. Then, the release lever 3 turns about a pivot pin 3e in a counter-clockwise direction under the action of a spring 4, first causing a lever 19 to be released from latching connection with an upwardly bent portion 3d thereof and then causing a latch lever 5 in unit B to be pushed by an end portion 3a and another latch lever 25 in unit C by another end portion 3c.

Latch lever 5 when pushed by release lever 3 turns in a clockwise direction against the force of a spring 6, taking a portion 5a thereof out of engagement with a bent portion 7d of a spring powered lever 7. Mounted on spring-powered lever 7 is a pivot pin 7a about which is rotatable an interconnecting lever 9. A mirror flip-up lever 11 is pivotally mounted on a common shaft 7b of lever 7, these levers 7 and 11 being rotatable relative to each other. In the illustrated position, one end 9a of interconnecting lever 9 is in engagement with a portion 11a of mirror flip-up lever 11 under the action of a spring 10. Therefore, when latch lever 5 is disengaged from power lever 7, the latter starts to rotate in a counter-clockwise direction by a drive spring 8. Such rotative movement is then transmitted through interconnecting lever 9 to turn mirror flip-up lever 11 as a unit therewith in a counter-clockwise direction. Mirror 12 is rotatable about a shaft 12a, and, in the illustrated position, lies in the optical path so that an object image bearing beam is reflected to the finder system. Halfway through counter-clockwise rotation of mirror flip-up lever 11 its armed portion 11b strikes a pin 14 mounted on a support of mirror 12 and pushes it upward, whereby mirror 12 is turned about a shaft 12a in the direction of the arrow as mirror flip-up lever 11 further turns, thus retracting from the light path to the photographic film. Such movement of lever 11 also causes its armed portion 11b to strike a winding stop release lever 15 at one end 15a thereof and to push it upward so that as the lever further turns, winding stop release lever 15 turns in a clockwise direction against a spring 16, while simultaneously turning a winding stop lever 65 in the clockwise direction againt a spring 66. At this time, also, the opposite end 11c of mirror flip-up lever 11 pushes a bent portion 17a of an automatic diaphragm lever 17 in unit A. Therefore, automatic diaphragm lever 17 turns in a clockwise direction against a spring 18. Thereby the opposite end 17b of automatic diaphragm lever 17 pushes a diaphragm closing-down lever (not shown) in the photographic lens mounting, until the aperture opening of the diaphragm in the lens mounting is closed down to the presetting determined by the aperture signal lever 33 in unit C. Though one end 7c of spring-powered lever 7 has so far pressed a charge lever 108 of a shutter mechanism to be described later in a charge completed state, as lever 7 turns in a counter-clockwise direction, the end 7c now retracts from the range of movement of charge lever 108, whereby shutter blades 102a, b, c and 103a, b, c are rendered able to run down.

After having disengaged from release lever 3, lever 19 turns in a counter-clockwise direction by a spring 20. Since a pawled drive lever 21 in unit C is urged in a counter-clockwise direction by a spring 22, as lever 19-which has so far hindered lever 21 from rotation escapes, lever 21 turns until it abuts on a pin 40a on a stop pawl lever 40. Though stop pawl lever 40 is rotatable about a common shaft with pawled drive lever 21, because pivoted armature 23 is attracted to electromagnet 24, it is at this time that lever 40 does not turn despite the fact that pawled drive lever 21 pushes a pin 40a in the counter-clockwise direction.

On the other hand, the aperture signal lever 43 of the lens now lies in a position for the full open aperture and is urged by a spring (not shown) in a direction indicated by the arrow, or toward the minimum aperture side, but is hindered from movement by an aperture signal lever 33 in unit C. A pin 32 mounted near the center of the length of aperture signal lever 33 is rotatably fitted in a gear 29 and an interconnecting lever 28. Another pin 35 mounted on aperture signal lever 33 is fitted in a slot 34 formed in a base plate of unit C. Interconnecting lever 28 is rotatably connected at the opposite end thereof to a lever 26. Therefore, so long as an end portion 26a of lever 26 engages an engagement portion 25a of latch lever 25 to hinder lever 26 from clockwise rotation, aperture signal lever 33 also does not take action. When release lever 3 turns latch lever 25 in a counter-clockwise direction against a spring 25b, the engaging relation between the lever 26 and latch lever 25 is released. Then, by the springing force acting on lens aperture signal lever 43 in the direction of the arrow, aperture signal lever 33 is pushed downward as viewed in the drawing. Such motion is transmitted through gear 29 and interconnection lever 28 to turn lever 26 in a clockwise direction against spring 27. Rotation of gear 29 is transmitted through gears 36, 37 and 38 to a stop wheel 39. At this time, a brush 31 provided on the free end of a lever 30 also goes round along with gear 29 while slidingly moving on a comb-like toothed pattern 42 provided on a substrate 41. As brush 31 passes through the teeth of the comb pattern successively, the voltages across the individual teeth change in sequence, and thus the amount of movement of brush 31 is counted. When the counted number has reached a level corresponding to the proper aperture value previously computed, a control circuit (not shown) cuts off the current supply to the solenoid of electromagnet 24 as is well known to those skilled in the art. Thereby stop pawl 40 because of the disappearance of the restraint by electromagnet 24 turns in a counter-clockwise direction under the action of the bias force of a spring 22 through pawled drive lever 21 and pin 40a against a spring 44. Upon engagement of a pawl 40b with stop wheel 39, rotation of stop wheel 39 is caused to stop. Therefore, motion of gear 29 and aperture signal lever 33 is stopped through gears 38, 37 and 36. Thus, the lens has the proper aperture opening.

After the elapse of a sufficient time to complete the aperture closing down operation of the lens, a control circuit of known construction initiates a shutter operation. A shutter base plate 101 has an exposure aperture 101a which, in the illustrated position, is covered by leading blades 103a, 103b and 103c. Leading blades 103a, 103b and 103c are each pivotally mounted on arms 106 and 107. Trailing blades 102a, 102b and 102c are similarly pivotally mounted on arms 104 and 105. Arms 104 and 107 are each urged by respective springs (not shown) in a clockwise direction. One end 104b of arm 104 is engaged with one end 110b of a trailing blade latch lever 110 by a spring 111 to thereby hinder arm 104 from clockwise rotation. As for arm 107 there is a similar latch lever for leading blades, but its illustration is omitted in the drawing.

Also in the drawing, arms 104 and 107 are shown as being held in the illustrated position by charge lever 108 through a pin 104a mounted on arm 104 and a pin 107a mounted on arm 107 against the aforesaid spring (not shown). But when armed portion 7c of spring-powered lever 7 is taken out of the range of movement of charge lever 108, charge lever 108 turns in a counter-clockwise direction by a spring (not shown), leaving arms 104 and 107 to be held in the illustrated positions by respective latch levers. Upon current supply to a leading blade electromagnet (not shown) for actuating the leading blade latch lever (not shown), the leading blade latch lever is attracted to leading blade electromagnet, being disengaged from arm 107. At this time, arm 107 is turned by the aforesaid spring in a clockwise direction to move leading blades 102a, 102b and 102c away from exposure aperture 101a, thus initiating an exposure of film. After that, when a time, from the start of current supply to the leading blade electromagnet to a moment at which a correct shutter time is obtained, has elapsed, a control circuit of known construction supplies current to a solenoid of a trailing blade electromagnet 109. Thereby one end 110a of trailing blade latch lever 110 is attracted to trailing blade control electromagnet 109, so that lever 110 is turned in a clockwise direction against spring 111. Therefore, the engaging portion 110b of lever 110 is disengaged from bent portion 104b of arm 104. Then arm 104 turns in a clockwise direction by the aforesaid spring, and the trailing blades 103a, 103b and 103c covers the exposure aperture 101a, thus terminating the exposure. Also, bent portion 104b of arm 104 acts on a normally open switch SW5 just before the terminal end of movement thereof, whereby switch SW5 is closed. Since, at this time, winding stop lever 65 is in counter-clockwise rotation pushed by winding stop release lever 15, switches SW41 and SW42 are placed in the turned-off position by a pin 65c mounted on winding stop lever 65. With this, current supply to motor 50 starts. 51 is a pair of leads to the motor winding with their tips insertable into an electrical circuit substrate (not shown). 52 is a first gear friction spring constituting a slip mechanism for preventing damage to the perforations when the film is tensioned excessively. 67 is a restraint washer; 53 is a washer. Rotation of motor 50 is transmitted through a speed reduction gear train comprised of a first gear 54, second gear 55, third gear 56, fourth gear 57 and fifth gear 58 to a winding-up gear 59, the winding-up gear 59 rotating in a clockwise direction when motor 50 is energized. It is also noted that the winding-up gear 59 rotates one revolution for every one frame of film to be wound up. Driving torque of winding up gear 59 is divided to a front plate charge system and a film transportation system. When winding up gear 59 rotates, a cutout gear 59a fixed to this winding up gear 59 rotates simultaneously. Such motion is transmitted through an intermediate gear 60 to turn a sector gear 61 about a pivot pin 61a in a clockwise direction. Thereby interconnection lever 77, its one end being pushed by a roller 62 on sector gear 61, is turned in a clockwise direction. Such motion is transmitted through a roller 79 on the opposite end thereof to turn a main charge lever 80 in a counter-clockwise direction. After that, as winding up gear 59 rotates almost one revolution, by which a predescribed amount of charge is completed, a cutout portion (not shown) of the cutout gear 59a returns again to a position facing intermediate gear 60, whereupon cutout gear 59a and intermediate gear 60 are taken out of mesh. By the bias force of interconnection lever return spring 78, therefore, interconnection lever 77, sector gear 61 and intermediate gear 60 are turned in the reversed or counter-clockwise direction, returning to their initial position limited by stopper 88.

In the film transportation system, rotation of winding-up gear 69 is transmitted through a winding shaft 63 to winding stop gear 64. Since, at this time, winding stop lever 65 is in counter-clockwise rotation with its free end 65b disengaged from cutout portion 64b as has been stated above, winding stop gear 64 then rotates. Rotation of winding stop gear 64 is transmitted to a sprocket gear 71a and therefrom further through a clutch mechanism to be described later to turn a sprocket 91 and a gear 71b. Rotation of this gear 71b is transmitted through an idle gear 72 to a spool gear 73. Since spool gear 73 has a spool friction spring 74, spool 75 is turned therethrough. On the outer surface of spool 75 there is provided a frictional rubber member 76 for automatic loading (not shown). When the film is being wound up, the difference between the feeding amounts of sprocket 91 and spool 75 is absorbed by a slip mechanism of spool friction spring 74.

The switch SW41 is a count switch which also serves as a motor de-energization control switch; switch SW42 is a motor braking switch when closed to short-circuit the ends of a motor winding. Switches SW41 and SW42 have ground terminals 69 connected to a camera housing, and contact timing of the switches SW41 and SW42 are made adjustable by eccentric support thereof. Shortly before winding by one frame of film is completed, an end portion 65b of winding stop lever 65 is brought into abutting engagement on a camming surface 64c of winding stop gear 64 by winding stop spring 66, causing switch 41 to be turned on so that current supply to motor 50 is stopped, and also causing switch SW42 to be turned on so that motor 50 is braked. After that, end portion 65b of winding stop lever 65 comes into engagement with a cutout portion 64a of winding stop gear 64. Thus, where the film is wound up by one frame, the subsequent operation is prohibited.

To rewind the film, the operator will push sprocket shaft 90 upward, whereby a lock lever 93 is allowed to engage in a cutout portion 90a of sprocket shaft 90 under the action of a spring 96. Then when the operator removes his finger depressing sprocket shaft 90, a sprocket spring 92 pushes down sprocket shaft 90 through restraint washer 89. Since the bias force of spring 95 urging lock lever 93 upward as viewed in the drawing is previously made weaker than the bias force of sprocket spring 92, it is at this time that lock lever 93 moves along a shaft 94 downward as viewed in the drawing. And, since in the illustrated position, an end portion 93a of lock lever 93 abuts on a pin 60a mounted on intermediate gear 60, its movement is stopped. At this time, a clutch mechanism to be described later releases sprocket gear 71a and sprocket 91 from operative connection with each other, and also gears 71a and 71b from the meshing engagement with each other, whereby sprocket 91 and spool 75 are also rendered freely rotatable. Thus, rewinding of film or cocking of the shutter for multiple exposure operation becomes possible.

When a winding operation is initiated, intermediate gear 60 starts to rotate in a counter-clockwise direction and a pin 60a is taken out of abutting engagement on end portion 93a of lock lever 93. Therefore, at this time, lock lever 93 moves again downward as viewed in the drawing under the action of the bias force of spring 89 until its shaft 93c is bottomed on a lower base panel 122 of the camera housing (see FIG. 2). By this movement, the end portion 93b of lock lever 93 is placed so as to engage pin 60a when pin 60a returns to the initial position as intermediate gear 60 rotates backward. Therefore, upon return of pin 60a to the initial position, the end portion 93a of lock lever 93 is pushed by pin 60a, so that lock lever 93 is turned in the counter-clockwise direction against a spring 96. That is, as has been stated above, just before the winding operation is terminated, the cutout gear 59a and intermediate gear 60 are taken out of mesh with each other, permitting intermediate gear 60 to turn backward by the bias force of spring 78. Then when pin 60a mounted thereon strikes lock lever 92, lock lever 93 is turned in the counter-clockwise direction, being disengaged from cutout portion 90a of sprocket shaft 90. Therefore, after the termination of the winding operation, sprocket shaft 90 moves downward by the bias force of spring 89, whereby motor 50 is brought again into drive connection with sprocket 91 and also with spool 75. Also, at this time, lock lever 93 also moves upward as viewed in the drawing along a shaft 94 by the bias force of spring 95 so that its end portion 93a is retracted to a position where it cannot engage pin 60a.

Thus, when in the illustrated or normal winding position, end portion 93a of lock lever 93 does not engage pin 60a of intermediate gear 60, there is no need to carry out further operations.

During charging operation of each unit, the roller 79 turns main charge lever 80 in the counter-clockwise direction against spring 84. A pin 83 provided on one end of main charge lever 80 pushes a cam portion 19a of lever 19 and turns lever 19 in the clockwise direction against spring 20. Such rotative movement of lever 19 causes pawled drive lever 21 to turn in the clockwise direction against spring 22. It is in this state that stop lever 40 because of the disappearance of the bias force by spring 22 wants to turn in the clockwise direction by spring 44, but stop wheel 39 still lies under the action of a force by lens aperture signal lever 43, so that stop lever 40 is hindered from rotation by pawled portion 40b arresting stop wheel 39. Upon further rotation of main charge lever 80, a spring 82 mounted on lever 80 so as to preset a force of prescribed magnitude abuts on a pin 85a mounted on an AE charge lever 85 which is pivotally mounted on a common shaft with main charge lever 80. Then main charge lever 80 and AE charge lever 85 continue to turn as a unit in a counter-clockwise direction. One end 85b of AE charge lever 85 pushes a side surface 26a of lever 26 and turns lever 26 in a counter-clockwise direction. This is followed by counter-clockwise movement of a gear 29 through an interconnecting lever 28, and aperture signal lever 33 pushes upward lens aperture signal lever 43 to the initial or full open position. Also stop wheel 39 turns in such a direction as to release the arresting connection with the pawled portion 40b of stop lever 40, permitting stop lever 40 to turn in the clockwise direction by spring 44, whereby armature 23 is pressed against electromagnet 24. After that, as main charge lever 80 further turns, since AE charge lever 85 does not move, the force applied to spring 82 exceeds the preset value, being deformed to absorb the overrun of main charge lever 80. Also main charge lever 80 has another spring 81 mounted thereon so as to similarly preset a certain constant force by which bent portion 3b of release lever 3 is pushed, causing release lever 3 to turn in the clockwise direction against spring 4.

With regard to unit B, as has been stated above, in the early stage of the winding operation, mirror release lever 70 pushes end portion 86a of quick return lever 86 against spring 87 so that the opposite end 86b of quick return lever 86 pushes bent portion 9a of interconnecting lever 9 and turns lever 9 in the counter-clockwise direction. Therefore, bent portion 9a of interconnecting lever 9 is disengaged from mirror flip-up lever 11 at portion 11a, permitting mirror flip-up lever to turn in the clockwise direction by spring 13. Following this, mirror 12 by a spring (not shown) and automatic diaphragm lever 17 by spring 18 rapidly return to their initial or illustrated positions. Thereby the closed-down lens opens fully without having to await the return of aperture signal lever 33 to the full open aperture position. Also, winding stop lever 65 turns in the clockwise direction by spring 66, but because the winding stop gear 64 has already turned, its end portion slidingly moves on the outer periphery of winding stop gear 64 without engagement in cutout portion 64a.

Main charge lever 80 when in its charging course pushes spring-powered lever 7 at end portion 7a, turning powered lever 7 in the clockwise direction against spring 8. Since, at this time, one end 7c of spring-powered lever 7 turns shutter charge lever 108 in the clockwise direction, arms 104 and 107 are caused through pins 104a and 107a to turn in the counterclockwise direction against a spring (not shown), going past respective latch levers and being stopped slightly beyond them. Shutter blades 102a through 102c and 103a through 103c also are returned to their initial positions, and interconnecting lever 9 also engages again with mirror flip-up lever 11 by spring 10. At this time, release lever 3 is turned in the clockwise direction by spring 81 and armature 2 is pressed against magnet unit 1 and maintained in this position by the magnetic force of the permanent magnet. Though main charge lever 80 tends to further turn, as spring 81 is bent, the over-charge is absorbed. Thereby latch lever 5 and latch lever 25 also return to the initial engaging relation. When winding comes to an end, interconnecting lever 77 turns in the clockwise direction by spring 78 as cutout gear 59a and intermediate gear 60 are released from the meshing connection. Main charge lever 80 also returns to the illustrated position by spring 84, and AE charge lever 85 responsive to return of main charge lever 80 returns to the initial position by a spring (not shown). Thus the illustrated or "ready to shoot" position is resumed. It is to be noted here that at this time the arms 104 and 107 of the shutter blades are held not by blade latch levers but by charge lever 108 so that even when a shock is given to the camera, through the blade latch levers become unstable, there is no possibility of accidental running down movement of the shutter blades.

Figure 2:
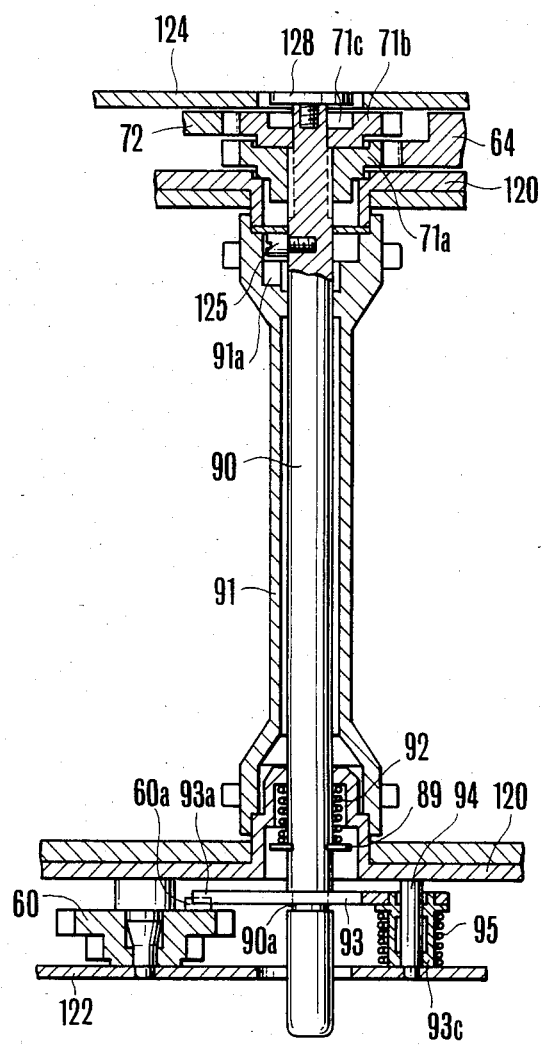
FIG. 2 is a sectional view of the essential parts the FIG. 1 embodiment.

FIG. 2 illustrates the details of the clutch mechanism of the FIG. 1 embodiment. In the illustrated position, sprocket shaft 90 is pushed upward as viewed in the drawing so that sprocket gear 71a and sprocket 70 are out of operative connection, and sprocket gear 71and gear 71b are out of mesh. Sprocket gear 71a is fixed to sprocket shaft 90 in the rotative directions and transmits rotation of winding stop gear 64 to sprocket shaft 90. Sprocket shaft 90 is rotatably and slidably supported on a base plate 130 and urged by a spring 92 to move downward as viewed in the drawing, but is shown as being hindered from downward movement by lock lever 93 engaging cutout portion 90a. Notice that these parts have been described above and their description is not repeated.

125 is a clutch pin mounted on sprocket shaft 90 upon engagement in a fitted groove 91a of sprocket 91 to interconnect sprocket 91 and sprocket shaft 90. Also 128 is a clutch pin fixed to sprocket shaft 90 upon engagement in a fitted groove 81c which is formed in gear 71b to interconnect gear 71b and sprocket shaft 90 so that rotation of sprocket shaft 90 is transmitted to a spool gear 73. It is noted that gear 71b and sprocket 91 are rotatably and slidably supported on sprocket shaft 90. Therefore, in the illustrated position, rotation of sprocket shaft 90 is not transmitted to sprocket 91 and spool 75 so that the film is not transported even though a winding operation is carried out.

After cutout portion 90a of sprocket shaft 90 has engaged lock lever 93, when lock lever 93 moves downward as viewed in the drawing by the bias force of spring 92 until its shaft bearing 93c abuts on the lower panel 122, end poriton 93a of lock lever becomes engageable with pin 60a of intermediate gear 60 so that as has been stated above, when intermediate gear 60 responsive to termination of the winding operation returns to the initial position, pin 60a pushes lock lever 93 at its end portion and releases sprocket shaft 90 from the locking connection with lock lever 93. Thereby lock lever 93 moves upward as viewed in the drawing by the bias force of spring 95, permitting its end portion 93a to clear pin 60a, and sprocket shaft 90 moves downward as viewed in the drawing by the bias force of spring 92, causing clutch pin 125 to engage in groove 91a, and clutch pin 128 to engage in groove 72c so that sprocket shaft 90 is in operative connection with sprocket 91 and spool 75.

In this embodiment, therefore, when sprocket shaft 90 is pushed upward as viewed in the drawing, sprocket 91 and the spool are rendered freely rotatable. In response to termination of the winding operation, this freed state is removed. Thus the multiple exposure technique can be performed.

Figure 3:
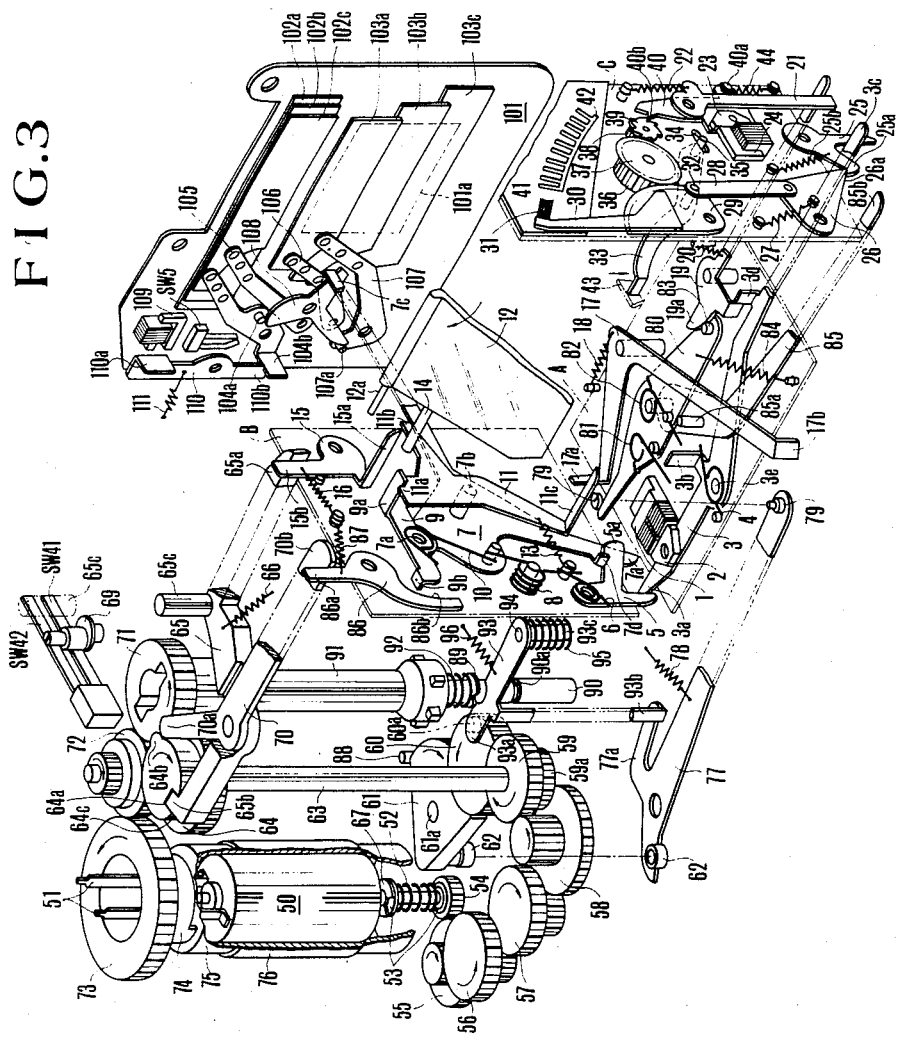
FIG. 3 is an exploded perspective view of a practical example of the application of the film transportation device of the invention into a camera which does not necessitate provision of the multiple exposure technique.

Next, FIG. 3 illustrates an example of application of the FIG. 1 embodiment to a camera which does not necessitate the multiple exposure function, where the same reference numerals have been employed to denote similar parts to those shown in FIG. 1.

In FIG. 3, 93b is a bent portion provided in lock lever 93 and arranged to engage an arm 77a of interconnection lever 77 when lock lever 93 in engagement with cutout 90a of sprocket shaft 90 moves downward as viewed in the drawing. For this reason, according to this embodiment, when interconnection lever 77 is turned in the clockwise direction by the winding operation, that is, just after the initiation of the winding operation, it is made possible to release the cutout 90a of sprocket shaft 90 from the connection with lock lever 93. Therefore, when the sprocket shaft 90 is pushed upward before the initiation of the winding operation, it is just after the initiation of the winding operation that the locking of sprocket shaft 90 by lock lever 93 is released. For accidental actuation of sprocket shaft 90 at a time during the winding operation, the locking of sprocket shaft is made to release in response to termination of the winding operation. Thus, the use of the double locking release mechanisms provides assurance that the locking release timing of sprocket shaft 90 can be effected.

Figure 4:
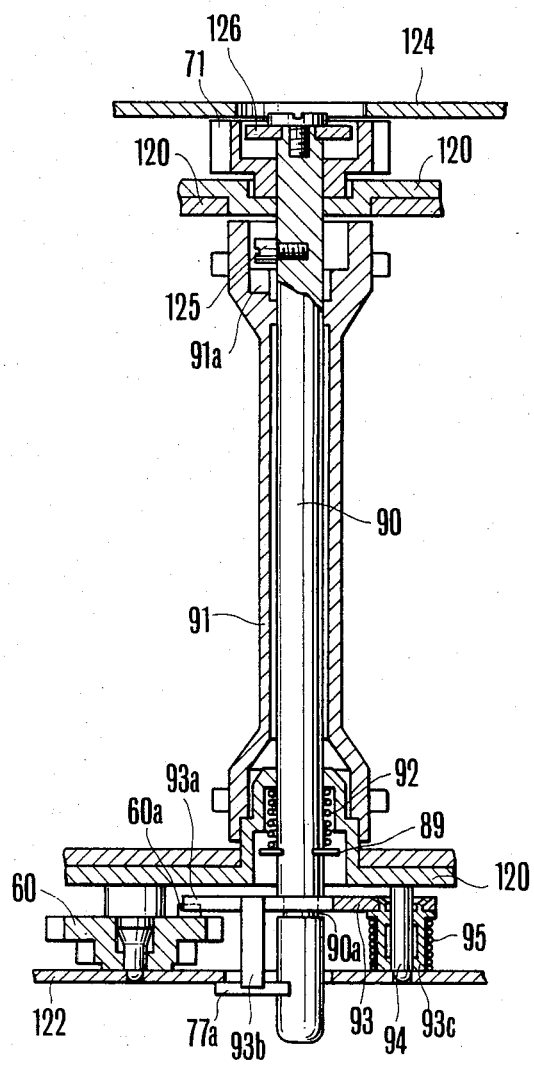
FIG. 4 is a sectional view of the essential parts of the FIG. 3 embodiment.

Also in a case where sprocket gear 71 rotating as a unit with sprocket shaft 90 is in mesh with winding stop gear 64 and intermediate gear 72 as in this embodiment, when the winding operation is performed while the sprocket shaft 90 is pushed upward so that pin 125 is out of engagement in groove 91a (see FIG. 4), the fact that, though sprocket 91 is free, spool 75 rotates through friction spring 74, gives rise to a problem that the film is transported irregularly, or that rotation of sprocket 91 due to the transportation of film differentiates the phases of pin 125 and groove 91a. According to this embodiment, however, the provision of the bent portion 93b engageable with arm 77a of interconnection lever 77 in the lock lever 93 is made to release the locking of sprocket shaft 90 in the position of FIG. 4 even just after the start of winding operation. Therefore, the above-described problem can be eliminated.

As has been described above, the present invention provides an operating member for switching a camera to a rewinding mode lockable in the rewinding position and to release this locking when the member which moves forward in response to winding of the camera moves backward, whereby the termination of the winding operation is followed by the release of the above-described locking with high accuracy and reliability, and it is possible to provide a mechanism of very simple structure for resetting the camera to superimpose two or more exposures.

While specific embodiments of the invention have been shown and described in detail to illustrate the application of the inventive principles, it will be understood that the invention may be embodied otherwise without departing from such principles.

What we claim:

1. A film transportation device for a camera comprising:
   (a) an operating member arranged upon movement from a first position to a second position to switch said camera to a rewinding mode;
   (b) a locking member for holding said operating member in said second position;
   (c) a changeover member supported to be movable forward and backward and arranged to move forward in response to winding up of the camera, said changeover member being taken out of cooperating relationship with the winding operation of the camera just before the winding operation of the camera is terminated; and
   (d) a spring member for urging said changeover member in the backward direction, said spring member driving said changeover member to move backward, whereby said locking member is pushed to take said locking member and said operating member out of engagement with each other.

2. A device according to claim 1, wherein said operating member is urged to move backward from said second position to said first position, and wherein said locking member is urged to move said operating member in a direction from said first position to said second position by a weaker force than that acting on said operating member.

3. A device according to claim 2, wherein said locking member when engaged with said operating member is caused by the difference between said bias forces to move a prescribed distance along the direction in which said operating member is operated, whereby said locking member becomes engageable with said changeover member.

4. A device according to claim 3, wherein said changeover member after having moved forward and backward then returns to a point near the initial position pushing said locking member.

5. A device according to claim 1, further comprising:
   (e) a pressing member arranged to apply pressure to said locking member just after the start of a winding operation of the camera, whereby the locking of said operating member is released.

* * * * *